Jan. 20, 1953  H. POKRAS  2,625,767
FISHING LURE
Filed May 31, 1949

INVENTOR.
HARRY POKRAS

BY  Lyon & Lyon
ATTORNEYS.

Patented Jan. 20, 1953

2,625,767

UNITED STATES PATENT OFFICE 2,625,767

FISHING LURE

Harry Pokras, Los Angeles, Calif., assignor of one-half to Eddie Epstein, North Hollywood, Calif.

Application May 31, 1949, Serial No. 96,307

9 Claims. (Cl. 43—42.05)

This invention relates to fishing lures and is particularly directed to improvements in lures of the type used when fishing for game fish such as, for example, barracuda, albacore, tuna, bonita, etc. Lures of this type commonly employ a plurality of streamers of "feathers" as they are known in the art, which streamers may be brightly colored to attract the game fish. The streamers ordinarily are attached at one end to a body or plug and extend along the leader or line into the vicinity of the hook. Lures of this type do not simulate the appearance of a small fish but have been used for many years by both commercial fishermen and sportsmen.

The principal object of my invention is to provide a lure of this type having parts separable in a novel manner so that it may be applied intermediate the ends of the leader or line and without requiring that the hook or any portion of the line or leader be disconnected.

A more particular object is to provide a lure of this type having separable body sections which are engaged about the line through relative motion in a direction longitudinal of the line.

Another object is to provide a lure having such separable body sections which are maintained against longitudinal separation by means of a resilient sleeve which carries the streamers or "feathers."

Another object is to provide such a device wherein the sleeve has a lateral slot extending into a central line-receiving opening so that the sleeve and streamers may be applied laterally to the line.

Another object is to provide a fishing lure having separable sections whereby it may be assembled about the line and whereby various color combinations of sections may be employed as desired, and whereby different colored streamers may be applied to the same body portion through a quick connection.

Other objects and advantages will appear hereinafter.

Figure 1:
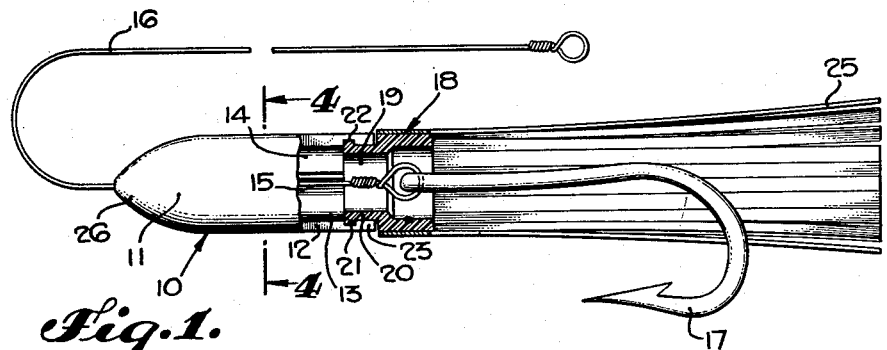
Figure 1 is a side elevation partly in section showing a preferred embodiment of my invention.
Figure 2:
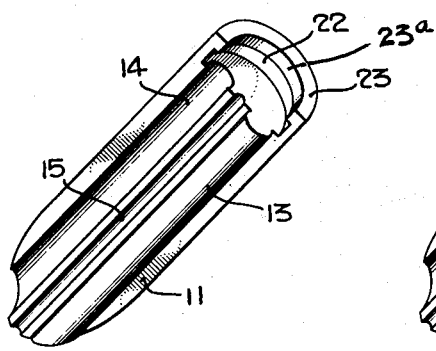
Figures 2 and 3 are perspective views showing the duplicate halves of the body.
Figure 3:
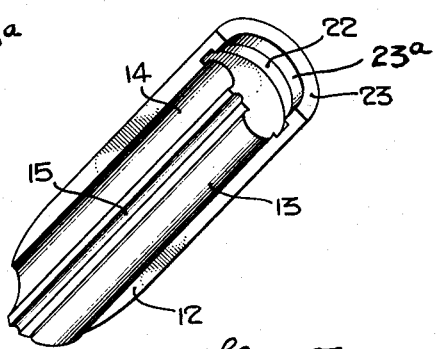
Figure 4:
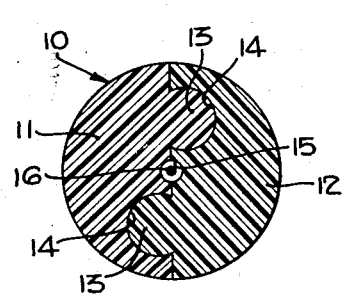
Figure 4 is a transverse sectional view taken substantially on the lines 4—4 as shown in Figure 1.
Figure 5:
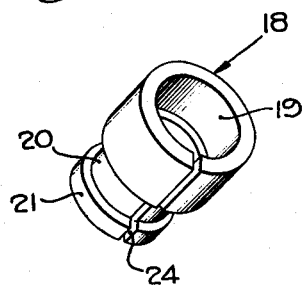
Figure 5 is a perspective view of the sleeve which carries the streamers.

Referring to the drawings, the plug or body generally designated 10 comprises a pair of separable body sections 11 and 12. These body sections may be substantially duplicates, and each is provided with a lateral rib or tongue 13 which extends into a corresponding socket 14 provided on the other section. The proportions of the tongue 13 and sockets 14 are such that lateral separation of the sections is prevented. Each of the sections is provided with a longitudinally extending central recess, and when the sections are assembled the recesses form a central opening 15 extending longitudinally through the body or plug. This central opening receives a fishing line or leader 16 to which is attached a conventional fish hook 17.

Means are provided for preventing longitudinal separation of the body sections 11 and 12, and as shown in the drawings this means includes a tubular sleeve 18 having a central opening 19 and provided with an upstanding rim 20. Annular flange 21 at the outer end of the rim 20 is received within an annular groove 22 formed in the body sections 11 and 12. A depending skirt 23 encircles the upstanding rim 20, the skirt being formed by a bore which in turn is formed by the semi-circular recesses 23a in the body sections 11 and 12. The sleeve 18 is provided with a lateral slot 24 communicating with the central opening 19 so that the sleeve may be applied laterally to the line 16. The presence of the slot 24 gives the sleeve sufficient resilience to enable the rim 20 and flange 21 to be sprung or snapped into place within the groove 22 and skirt 23 in the body sections.

A plurality of "feathers" or streamers 25 may be fixed to the outer periphery of the sleeve 18 in any convenient fashion. These streamers 25 may be formed of any suitable or desirable material, but I have found that lengths of brightly colored plastic are admirably suited for this purpose. The strips may be glued to the sleeve 18 if desired, or they may each extend from a continuous length formed integrally therewith, and said continuous length may be affixed to the sleeve 18.

It will be observed that the cylindrical portion of the sleeve 18 forms a continuation of the cylindrical body, and that the forward end of the body may have a rounded nose 26. When assembled the body sections and sleeve act as a single integral unit. While disassembly of the parts for the purpose of installing a different lure on the line or leader 16 is normally accomplished by first detaching the skirt and then separating the section halves longitudinally, it is possible to install the sections 11 and 12 on the line through relative lateral movement. This is possible by springing or snapping the tongues 13 into the grooves 14. When the sleeve 18 is in position, disassembly of the parts 11 and 12 is prevented since there is normally no force tending to separate the body sections laterally.

In the event that a large fish should strike the lure, the streamers 25 may be damaged, and it is often desirable to replace the streamers without requiring that the plug or body be removed from the line or leader. This can readily be accomplished with the lure shown in the drawings since the sleeve 18 may be withdrawn and replaced, the leader 16 passing through the slot 24. The two body sections and sleeve 18 may be formed of the same or different colors and the sectional construction permits a quick change of colored parts when desired. Thus the body sections may be red while the streamers 25 are blue or white. Any desired color combination can readily be effected.

Having fully described my invention, it is to be understood that I do not wish to be limited to the details herein set forth, but my invention is of the full scope of the appended claims.

I claim:

1. In a fishing lure adapted to be assembled about a line, the combination of a plurality of body sections, cooperating parts on the sections engageable through relative motion in a direction longitudinally of the line for securing the sections together about the line, and the body sections having semicircular recesses formed in one of their ends which cooperate to define a bore, a groove formed in the side wall of the bore, and a split sleeve having a flange adapted to be laterally expanded into engagement with the walls of the groove to prevent longitudinal separation of the body sections.

2. In a fishing lure adapted to be assembled about a line, the combination of a pair of body sections, cooperating parts on the sections engageable through relative motion in a direction longitudinally of the line for securing the sections together about the line, the body sections having semicircular recesses formed in one of their ends which cooperate to define an annular groove and a bore communicating with said groove, a sleeve having a longitudinal opening to receive the line and a lateral slot to permit lateral application of the sleeve on the line, the sleeve also having an annular flange expanded outwardly into said groove to prevent longitudinal separation of the body sections, the slot permitting deformation of the sleeve for engaging said part in the groove.

3. In a fishing lure adapted to be assembled about a line, the combination of a pair of body sections, cooperating parts on the sections engageable through relative motion in a direction longitudinally of the line for securing the sections together about the line, the body sections having semicircular recesses formed in one of their ends which cooperate to define a bore, an annular groove forming a continuation of said body sections and a sleeve formed in the side wall of the bore having a longitudinal opening to receive the line and a lateral slot to permit lateral application of the sleeve on the line, a plurality of streamers fixed on the sleeve, the sleeve also having an annular flange which may be detachably inserted in said groove to prevent longitudinal separation of the body sections, the slot permitting deformation of the sleeve for engaging said part in the groove.

4. In a fishing lure adapted to be assembled about a line, the combination of a plurality of body sections, cooperating parts on the sections engageable through relative motion in a direction longitudinally of the line for securing the sections together about the line, the body sections having semicircular recesses formed in one of their ends which cooperate to define a bore, an annular internal groove formed in the side wall of the bore, a sleeve forming a continuation of the body sections and having a longitudinal opening to receive the line and a lateral slot to permit lateral application of the sleeve on the line, the sleeve also having an annular flange received in said groove to prevent longitudinal separation of the body sections, the slot permitting deformation of the sleeve for engaging said lip in the groove.

5. In a fishing lure adapted to be assembled about a line, the combination of a pair of duplicate body sections, each section having a tongue engageable through relative motion in a direction longitudinally of the line with a groove on the other section for securing the sections together about the line, the body sections having semicircular recesses formed in one of their ends which cooperate to define a bore, an annular groove formed in the side wall of the bore, a tubular resilient sleeve forming a continuation of the body sections and having a longitudinal opening to receive the line and a lateral slot to permit lateral application of the sleeve on the line, the sleeve also having an annular flange received in said groove to prevent longitudinal separation of the body sections, a plurality of streamers fixed to the sleeve, the slot permitting deformation of the sleeve for engaging said part in the groove.

6. In a fishing lure adapted to be assembled about a line, the combination of a pair of duplicate body sections cooperating to form a cylindrical plug with a rounded nose, each section having a tongue engageable through relative motion in a direction longitudinally of the line with a groove on the other section for securing the sections together about the line, the body sections having semicircular recesses formed in one of their ends which cooperate to define an annular internal groove and a bore communicating with said groove, a tubular resilient sleeve forming a cylindrical continuation of the plug and having a longitudinal opening to receive the line and a lateral slot to permit lateral application of the sleeve on the line, the sleeve also having an annular flange received in said groove to prevent longitudinal separation of the body sections, a plurality of streamers fixed on the outer periphery of the sleeve, the slot permitting deformation of the sleeve for engaging said lip in the groove.

7. In a fishing lure adapted to be mounted upon a line, the combination of: a body shaped as a cylindrical plug with a rounded nose and having a central axial opening to receive the line, a bore in said body forming a skirt at the opposite end from the rounded nose, the skirt having an internal annular groove formed in its side wall, a sleeve forming a continuation of the body and having a longitudinal opening to receive the line, the sleeve also having a lateral slot to permit lateral application of the sleeve on the line, and a plurality of streamers fixed to the sleeve, the sleeve having an annular flange received in said groove to prevent separation of the sleeve and body, the slot permitting deformation of the sleeve for engaging said part in the groove.

8. In a fishing lure adapted to be mounted upon a line, the combination of: an elongated body having a central axial opening to receive the line, a bore in said body forming a skirt having an internal annular groove formed in its side wall, a sleeve forming a continuation of the body and having a longitudinal opening to receive the line, the sleeve also having a lateral slot to permit lateral application of the sleeve on the line, and a plurality of streamers fixed to the sleeve, the sleeve having an annular flange received in said groove to prevent separation of the sleeve and body, the slot permitting deformation of the sleeve for engaging said part in the groove.

9. In a fishing lure adapted to be mounted upon a line, the combination of: an elongated cylindrical body member having a central axial opening to receive the line, the body member having a radially extending annular groove near one end and a bore communicating with said groove, a sleeve member forming a continuation of the body member and having a longitudinal opening to receive the line, the sleeve member having a lateral slot to permit lateral application on the line, a plurality of streamers fixed to the sleeve member, an annular flange on the sleeve, one of the members encircling a portion of the other in telescopic relation so that the annular flange on the sleeve engages within the groove to prevent axial separation of said members, the slot permitting deformation of the sleeve member for engaging said part in the groove.

HARRY POKRAS.

REFERENCES CITED

The following references are of record in the file of this patent:

UNITED STATES PATENTS

| Number | Name | Date |
| --- | --- | --- |
| 287,651 | Faust | Oct. 30, 1883 |
| 419,574 | Vasseur | Jan. 14, 1890 |
| 582,948 | Pinover | May 18, 1897 |
| 1,454,820 | Readle | May 8, 1923 |
| 2,102,839 | Dohrman | Dec. 21, 1937 |
| 2,241,851 | Gilstrap | May 13, 1941 |
| 2,255,793 | Kridler | Sept. 16, 1941 |
| 2,319,147 | Mason | May 11, 1943 |